US011582972B2

(12) United States Patent
Guerret et al.

(10) Patent No.: US 11,582,972 B2
(45) Date of Patent: Feb. 21, 2023

(54) CONTROLLED-DIFFUSION SEMIOCHEMICAL COMPOSITION

(71) Applicant: MELCHIOR MATERIAL AND LIFE SCIENCE FRANCE, Lacq (FR)

(72) Inventors: Olivier Guerret, Pern (FR); Samuel Dufour, Magny le Hongre (FR)

(73) Assignee: MELCHIOR MATERIAL AND LIFE SCIENCE FRANCE, Lacq (FR)

( * ) Notice: Subject to any disclaimer, the term of this patent is extended or adjusted under 35 U.S.C. 154(b) by 159 days.

(21) Appl. No.: 16/956,327

(22) PCT Filed: Dec. 21, 2018

(86) PCT No.: PCT/EP2018/086756
§ 371 (c)(1),
(2) Date: Jun. 19, 2020

(87) PCT Pub. No.: WO2019/122410
PCT Pub. Date: Jun. 27, 2019

(65) Prior Publication Data
US 2020/0315182 A1   Oct. 8, 2020

(30) Foreign Application Priority Data
Dec. 22, 2017  (FR) ...................... 1762907

(51) Int. Cl.
*A01N 63/14* (2020.01)
*A01M 1/02* (2006.01)
*A01N 25/02* (2006.01)
*A01N 25/18* (2006.01)
*A01N 31/02* (2006.01)
*A01N 31/08* (2006.01)
*A01N 43/16* (2006.01)

(52) U.S. Cl.
CPC ............... *A01N 63/14* (2020.01); *A01M 1/02* (2013.01); *A01N 25/02* (2013.01); *A01N 25/18* (2013.01); *A01N 31/02* (2013.01); *A01N 31/08* (2013.01); *A01N 43/16* (2013.01)

(58) Field of Classification Search
CPC .......... A01N 63/14; A01N 1/02; A01N 25/02; A01N 25/18; A01N 31/02; A01N 31/08; A01N 43/16
See application file for complete search history.

(56) References Cited

U.S. PATENT DOCUMENTS 6,896,196 B2 * 5/2005 Vieira ................ A01M 1/2044
239/42

FOREIGN PATENT DOCUMENTS

| CN | 105594697 A | 5/2016 | |
|---|---|---|---|
| EP | 0194896 A2 | 9/1986 | |
| EP | 3187046 A1 * | 7/2017 | ............. A01N 37/04 |
| KR | 10-2016-0057708 A | 5/2016 | |
| KR | 10-2017-0128993 A | 11/2017 | |

OTHER PUBLICATIONS

Yulei Fang, Rui Zeng, Shufang Lu, Luyao Daia and Xinlong Wan, "The synergistic attractiveness effect of plant volatiles to sex pheromones in a moth", Journal of Asia-Pacific Entomology 21 (2018) 380-387. (Year: 2018).*
Imene Said, Michel Renou, Jean-Paul Morin, Joana M. S. Ferreira and Didier Rochat, "Interactions Between Acetoin, a Plant Volatile, and Pheromone in Rhynchophorus palmarum: Behavioral and Olfactory Neuron Responses", Journal of Chemical Ecology, 31(8), 2005, 1789-1805. (Year: 2005).*
Peter A. Edde, Michael D. Toews and Thomas W. Phillips, "Effects of Various Semiochemicals on the Responses of Rhyzopertha dominica to Pheromone Traps in the Field", Annals of the Entomological Society of America, 104(6):1297-1302 (2011). (Year: 2011).*
Database WPI, Week 201646, Thomson Scientific, London, GB, AN 2016-33180P, May 24, 2016, 4 pages.
Database WPI, Week 201668, Thomson Scientific, London, GB, AN 2016-35518D, May 25, 2016, 2 pages.
Database WPI, Week 201804, Thomson Scientific, London, GB, AN 2017-846174, Nov. 24, 2017, 4 pages.
Dhouibi et al., "Effect of Trap Size and Pheromone Capsule Types on the Trapping Efficacy for the Red Palm Weevil," International Journal of Agriculture Innovations and Research, vol. 5, Issue 6, Jun. 19, 2017, pp. 1069-1076.

* cited by examiner

*Primary Examiner* — Mina Haghighatian
*Assistant Examiner* — Nathan W Schlientz
(74) *Attorney, Agent, or Firm* — Birch, Stewart, Kolasch & Birch, LLP

(57) ABSTRACT

The present invention describes a new technology for the formulation of semiochemicals in wick diffusers particularly effective in controlling the diffusion of semiochemicals over periods of several months regardless of the outside temperature.

14 Claims, No Drawings

CONTROLLED-DIFFUSION SEMIOCHEMICAL COMPOSITION

The present invention describes new ethanolic formulations of semiochemicals in wick diffusers which are particularly effective in regulating the diffusion of several semiochemicals with different volatilities over periods of several months, regardless of the outside temperature.

To deal with problems of insect invasion in the fields of agricultural and public health, a number semiochemical-based technologies have recently been developed. Semiochemical substances (pheromones, kairomones, allomones and synomones) are substances of varying volatility which are increasingly used in many fields, for example to control animal behavior or to regulate insect pest populations. Semiochemicals are pure or mixed chemical substances used by a large number of animal species to communicate.

Semiochemical substances are divided into different classes according to the nature of the sender or receiver. One class, for example, are pheromones—which allow communication between individuals (usually insects) of the same species. Pheromones are chemical substances comparable to hormones, emitted by most animals, especially insects, and which act as messengers between individuals of the same species, transmitting information to other individuals that plays a role in sexual attraction in particular.

Another class is allomones, which are semiochemical substances produced by a living being and which interact with another living being of a different species; animal species to other animal species and/or plants to animal species. This interaction is positive for the emitting species.

Another class is kairomones, which are substances released into the environment, produced by a living emitter (which may be a plant, animal, fungus or bacterial colony), that trigger a behavioral response in another receptor species by providing a benefit. Finally, there are synomones, which encompass the semiochemical substances produced by a living being, which trigger a behavioral response in another species and whose effect is positive for the emitter and the receiver.

Semiochemical substances can be perceived by smell for volatile compounds, or by taste for non-volatile compounds. The information carried by the semiochemicals can allow localization and recognition, in particular of a sexual partner in the case of pheromones.

Semiochemicals, and more particularly pheromones, are chemical compounds of which a large number of examples (8000) are given in the online database Pherobase (www.pherobase.com).

The use of pheromones to control populations of crop insect pests is well known to the person skilled in the art. Since insect invasions occur several times a season, the problem of spreading a sufficient quantity of pheromone throughout the season to either guide the insects to an insect trap or to saturate the antennae of the insects that normally allow a male to find females (or the opposite) must be solved.

The functions of these substances depend on the reaction they cause in individuals. Some pheromones will be attractive while others may be repellent.

The understanding of the relationship between semiochemicals and insect behavior is a science called ethology and many publications illustrate different insect behaviors as a function of such substances.

In many cases, it has been established that odors, particularly of plant origin, strongly increase the attractiveness of the pheromones of certain insects.

The synergistic effect of plant odors on pheromone communication has been demonstrated following the very weak attraction of some aggregation pheromones in the field, unsatisfactory for agronomic applications. This synergy is generally attributed to the increased attraction of the pheromone by a plant odor at a higher level than that of the pheromone alone.

For example, in *Carpophilus hemipterus*, the capture of pheromone baited traps and rotten grapes was significantly higher than that of pheromone alone (15 times) or with plant material alone.

Nitidulidae are attracted by the odors of a wide range of fermented foods such as bread dough, fruits and vegetables and in several species, the aggregation pheromones produced by males have been identified with very weak attractant effects but with a synergistic effect with food odors.

In *Metamasius hemipterus sericeus*, high doses of ethyl acetate (>800 mg/d), ethyl propionate (>300 mg/d), ethyl butyrate (>100 mg/d) or a mixture of the three products were as attractive as 250 g of sugarcane. Ethyl acetate at a dose>650 mg/d showed a synergistic effect with pheromones equivalent to 250 g of sugarcane in the field.

However, these synergistic compounds are highly volatile which makes them difficult to combine with insect pheromones whose boiling point is often above 150° C. or even higher.

It is therefore very important to be able to control a homogeneous release over long periods of time of pheromone formulations, particularly ethanolic formulations in which the evaporation of ethanol also poses a challenge. Indeed, ethanol has a higher volatility than many pheromones and in a hot environment, the ethanol is entirely evaporated whereas the pheromone is only partially evaporated. Moreover, given the pheromone synergizing nature of ethanol (as a fruit degradation product), once ethanol evaporates, its synergistic effect disappears.

It is therefore important to control the simultaneous evaporation of the pheromone, the ethanolic solvent (which may act as a synergizing agent) and a possible volatile synergizing agent, for example ethyl acetate.

Considering the example of the red palm weevil, the most effective attractant mixture contains 76% ethanol 25.4% ethyl acetate and 0.6% ferrugineol. The boiling point of ferrugineol is 208° C., which makes it difficult to evaporate simultaneously with ethanol and ethyl acetate.

Another problem encountered by the skilled person in the fight against this insect is the diffusion time of ethanolic formulations. Indeed, in hot countries in particular, attacks by the red weevil occur throughout the year. In a hot environment, the rapid evaporation of ethanol makes it necessary to refill the traps very regularly, which is costly. Moreover, the evaporation time depends very strongly on the temperature, which makes the diffusion time random due to seasonal temperature variations.

The skilled person has tried to construct strategies to solve both problems. For example, the use of two diffusers in parallel has been developed as reported in (Dhouibi et al. International Journal of Agriculture Innovations and Research Volume 5, Issue 6, 2319-1473).

The company Arysta has developed bottles with porous membranes or wicks that are supposed to delay the evaporation of the formulation. For example, in spring in the south of France, such a formula will be active for 2 to 3 months whereas in the middle of summer it will not last more than 1 month, which is notoriously insufficient.

These solutions are therefore temperature-dependent and do not have sufficient resistance to avoid frequent and costly maintenance in the field.

The present invention relates to the controlled release into the atmosphere of various volatile semiochemical substances by means of an ethanolic liquid composition comprising a pheromone and a polymer whose solubility increases with temperature and thus allows an increased viscosity at high temperatures (of the order of 40° C.) and a lower viscosity at low temperatures (of the order of 10 to 20° C.). Thus, at low temperatures, the release of the pheromone is facilitated, relative to high temperatures where the viscosity limits volatility.

Thus, in a first embodiment, the present invention proposes a pheromone formulation comprising:
a) 20% to 90%, by volume, of ethanol,
b) 0.1% to 10%, by weight, of at least one pheromone whose boiling temperature is greater than 180° C. at atmospheric pressure,
c) 0.1% to 10% by weight of a polymer whose solubility, in ethanol, is greater than 10% (w/v) at 70° C. and less than 1% (w/v) at 20° C.,
d) 0 to 40% by weight of at least one pheromone synergizing compound,
e) from 0 to 5% by weight of antioxidants.

The % by weight are given in relation to the total weight of the formulation.

According to an embodiment of the invention, the amount of ethanol is between 30 and 90%, particularly between 40 and 90%, more particularly between 50 and 90%, more particularly between 60 and 90%, and even more particularly between 70 and 90%, by volume in relation to the volume of the formulation.

The amount of pheromone with a boiling point above 180° C. in the formulation according to the invention may be between 0.1 and 10%, particularly between 0.5 and 10%, more particularly between 1 and 10%, more particularly between 2 and 6%, particularly around 5%, by weight in relation to the weight of the formulation.

According to the invention, the pheromone(s) has/have a boiling temperature above 180° C. at atmospheric pressure, particularly above 185° C., more particularly above 190° C., even more particularly above 200° C. Atmospheric pressure means a pressure of 760 mmHg.

Among the examples of pheromones known and usable according to the present invention mention may be made of methyl-octanoic acid derivatives, lavandulol derivatives, lactones containing rings of 5 to 10 carbon atoms, long-chain pheromones, and mixtures thereof.

According to an embodiment, the pheromone is selected from the group consisting of insect pheromones, particularly lepidopteran sex pheromones, coleopteran pheromones, dipteran pheromones and mixtures thereof.

Advantageously the pheromone can be selected from ferrugineol, ferrugineone or a ferrugineol-ferrugineone mixture, sordinin, codlemone, 4-hydroxy-1,7-dioxaspiroundecane, geraniol, geranyl hexanoate, and mixtures thereof.

As indicated, according to an embodiment, the pheromone, selected preferentially from insect sex pheromones, has a boiling point at atmospheric pressure above 180° C.

The pheromones which can be used in a formulation according to the invention are all insect pheromones but, in particular, lepidopteran sex pheromones, coleopteran pheromones (such as sordinin and ferrugineol), and dipteran pheromones and mixtures thereof.

In an embodiment of the invention, the pheromone is selected from the group consisting of red palm weevil pheromone, banana weevil pheromone, click beetle pheromone, olive fly pheromone, codling moth pheromone, husk fly pheromone, *Eudemis* pheromones, vine moth pheromones, vine mealybug pheromones, cocoa tree mirid pheromones, and mixtures thereof.

According to a particular embodiment the pheromone is selected from the group consisting of red palm weevil pheromone, banana weevil pheromone, click beetle pheromone, olive fly pheromone, codling moth pheromone, husk fly pheromone, *Eudemis* pheromones, vine moth pheromones, sordidin, ferrugineol, ferrugineone, sordinin, codlemone and mixtures thereof.

In another embodiment, the above pheromones can be used in a mixture to attract several types of insects in a trap.

The pheromone synergizing compound is, as indicated above, a compound that potentiates the pheromone's attracting effect.

Such compounds are well known to the skilled person and are variable depending on the pheromone considered, on the crop to be protected and on the target insect.

Many compounds, as mentioned in the introduction, can play this role of pheromone synergist.

Such compounds are identified and identifiable classically and routinely by a person in the art.

For example, as mentioned, a compound synergizing the *Carpophilus hemipterus* pheromone may consist of rotten grapes because it has been found that insect capture using this pheromone is significantly higher when the two are combined compared to the situation when the pheromone is used alone or when rotten grapes are used alone.

Such a definition of a synergistic compound is based on the classic notion of carrying out a synergy study as any skilled person knows how to do, which consists of comparing the effect of using two compounds together compared to the sum of the individual effects.

Such functionality can be verified through classical and routine testing.

Indeed, it is well known that plant odors, in the presence of the pheromone, can modify and amplify the effect of the pheromone and thus the insect's behavior: the males of several species of butterflies are more attracted, for example, by mixtures of pheromone and volatile compounds from plants on which caterpillars feed or from flowers visited by these butterflies.

Therefore, screening, not among all possible and imaginable chemical compounds or materials, but among the compounds or materials of plant origin available, is a routine and usual task within the reach of any skilled person.

The pheromone synergizing compound may be selected from the group consisting of (C1-C6)alkyl acetate, ammonium acetate, acetoin, ammonia, ammonium carbonate and ammonium phosphate and mixtures thereof.

Examples of pheromone synergizing compounds include alkyl acetates, i.e. esters of acetic acid with an alkanol.

These include linear or branched (C1-C6)alkyl acetates and mixtures thereof. Thus the pheromone synergizing compound can be selected from the group comprising (C1-C6) alkyl acetates. In particular, the pheromone synergizing compound may be selected from the group comprising methyl acetate, ethyl acetate, propyl acetate, isopropyl acetate, butyl acetate, isobutyl acetate, pentyl acetate, isopentyl acetate and hexyl acetate, and mixtures thereof.

The pheromone synergizing compound may be selected from the group consisting of esters of a C1-C6 carboxylic acid with ethanol. In particular, the pheromone synergizing compound may be selected from the group consisting of ethyl methanoate, ethyl ethanoate, ethyl propanoate, ethyl butanoate, ethyl pentanoate, ethyl hexanoate and mixtures thereof.

The pheromone synergizing compound may also be selected from the group consisting of acetic acid, ammonium acetate, acetoin (or 3-hydroxybutanone), ammonia, ammonium carbonate, ammonium phosphate and mixtures thereof.

The pheromone synergizing compound may be selected from the group comprising terpene derivatives, in particular alpha-pinene and menthol.

The pheromone synergizing compound may be selected from the group consisting of salicylic acid and derivatives thereof.

The pheromone synergizing compound may be selected from the group consisting of all of the above compounds and mixtures thereof.

The pheromone synergizing compound or mixture of pheromone synergizing compounds is included in an amount ranging from 0 to 40%, in % by weight of the formulation, particularly between 5 and 40%, more particularly between 5 and 30%, and preferably in the range of about 15 to 20%.

According to an embodiment, the compound synergizing the pheromone (s) is different from ethanol.

Antioxidants, when present, may be selected from the group consisting of vitamin E, butylated hydroxyanisole (BHA), butylated hydroxytoluene (BHT) used alone or in a mixture. These antioxidants protect the semiochemical substance from degradation and may be added in amounts, in percent by weight of the composition, ranging from about 0.1% to about 5%, particularly between 0.5 and 2%.

The polymer of the formulation according to the invention and whose solubility, in ethanol, is greater than 10% (w/v) at 70° C. and less than 1% (w/v) at 20° C., is particularly an acrylic block copolymer-based polymer.

The amount of polymer may be between 0.1 and 10%, particularly between 0.5 and 5% by weight of the formulation.

In particular, said polymer is an acrylic block copolymer and comprises at least one C1-C6 alkyl, in particular methyl, ethyl or butyl, polymethacrylate block and at least one C1-C6 alkyl, in particular methyl, ethyl or butyl, polyacrylate block.

According to an embodiment, the polymer is an acrylic block copolymer and is a diblock or triblock copolymer.

According to another embodiment of the invention, the triblock copolymer comprises at most 2 identical blocks.

The acrylic block copolymer is selected from the group consisting of copolymers comprising at least one poly(alkyl methacrylate) block and at least one poly(alkyl acrylate) block.

According to a particular embodiment, the poly(alkyl methacrylate) is poly(methyl methacrylate) (PMMA).

According to an embodiment of the present invention, the poly(alkyl acrylate) is selected from the group consisting of poly(butyl acrylate) (PABu) and a copolymer of butyl acrylate and 2-ethyl-hexyl acrylate.

According to an embodiment of the invention, the polymer is a PMMA-PABu-PMMA type triblock acrylic block copolymer.

According to an embodiment, the polymer has an average molecular weight of between 10 000 and 200 000 g/mol, particularly between 20 000 and 200 000 g/mol, more particularly between 30 000 and 150 000 g/mol.

In the context of the present invention, the expression "block copolymer" represents a block copolymer derived from several species of polymers.

In the context of the present invention, the expression "block" represents the part of a macromolecule comprising a plurality of constituent units and which has at least one particularity of constitution or configuration which does not appear in the adjacent parts.

Various suitable block copolymers particularly adapted to the present invention are commercially available from the company Arkema, for example Nanostrength® triblock copolymers of poly(butyl acrylate) (PABu) and poly(methyl methacrylate) (PMMA) obtained by radical polymerization controlled by a nitroxide according to the known and documented Blockbuilder® technology. Particular mention may be made of Arkema's Nanostrength® range of copolymers and more particularly M53® and M22®.

The inventors indeed noted that polymers consisting of acrylic block copolymers according to the invention, in particular triblocks of poly(butyl acrylate) (PABu) and poly (methyl methacrylate) (PMMA), generally used for their adhesive properties, impact resistance, transparency, allowed a differential viscosity of the ethanolic formulation according to the temperature and thus allowed a modulation of the release of the pheromone and the pheromone synergizing compound when present. Indeed, given the low solubility of the polymer in ethanol at room temperature or below, the composition has a lower viscosity and the volatility of the pheromone is facilitated. Conversely, at higher temperatures (around 40 or 50° C.), the solubility of the polymer is increased and the viscosity of the formulation as well. This increase in viscosity slows the volatility of the pheromone. In the end, a formulation is obtained in which the release of the pheromone and the optional pheromone synergizing compound (which is also volatile) is equivalent. The ethanol in the formulation is also evaporated in a similar manner to the pheromones and to the pheromone synergizing compounds. According to an embodiment the invention also relates to a diffuser comprising:
  a tank with an opening,
  a formulation according to the invention,
  a cap closing the tank and having an opening
  a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

In a particular embodiment, the diffusion means is a wick, in particular a wick of composite material containing pine powder or any other comparable material.

According to another embodiment, the invention provides a kit comprising:
  a tank having an opening closed by a cap provided with an opening and traversed by a diffusion means extending on either side of said cap,
  a formulation according to the invention.

The formulations according to the invention can be used in wick diffusers and make it possible to obtain homogeneous and linear diffusions of pheromone and of pheromone synergizing compound for periods of more than 2 months at 40° C.

The invention further relates to the use of a formulation or a diffuser according to the invention for protecting a crop against insect pests.

Another advantage of these solutions is that their diffusion kinetics in wick diffusers are little affected by outside temperature differences.

The skilled person will also add any stabilizers such as antioxidants, which are necessary to preserve the integrity of the mixture during the entire period of use, as already widely described in the prior art.

Such formulations are advantageously used in wick diffusers or any other diffusion system for insect trapping, whether for monitoring or mass trapping purposes.

EXAMPLES

Example 1

Material and Method of Manufacture

The diffusers consist of commercial PET bottles with a capacity of 50 ml, capped by a polyamide or polypropylene wick holder.

The wicks used are commercial so-called "wood composite" wicks purchased for example from the company Shanghai Prima.

Additive polymers are Nanostrength block copolymers manufactured by Arkema. The item numbers of these products are: Nanostrength M22 and M53 (both corresponding to an acrylic block copolymer consisting of a central block of poly(butyl acrylate) surrounded by two blocks of poly(methyl methacrylate)).

The cold and hot solubilities of these polymers in ethanol are given in the following table:

|  | M22 ® | M53 ® |
|---|---|---|
| Solubility at 19° C. (% by weight) | 0.022% | 0.045% |
| Solubility at boiling point (70° C.) (% by weight) | >15% | >10% |

The polymers M22® and M53® therefore meet the definition of the invention. They have the feature of not being cold soluble (therefore not viscosifying the solution when cold, but viscosifying the solution when hot).

Example 2

The formulations in the following examples are manufactured using the following process:

A mixture containing the mixture of pheromone and pheromone synergizing compound in alcohol is prepared in a round-bottom flask.

This mixture is heated to 40° C. and then the desired amount of polymer additive is added and kept stirred at 40° C. until the polymer is completely dissolved. The temperature of the mixture is then returned to room temperature.

The bottles are then filled with 24 g or 48 g per bottle and capped with the wick holder, the wick and the screw cap.

The following table summarizes the mixtures that were manufactured according to the invention under these conditions:

| Example | 2A | 2B | 2C | 2D | 2E | 2F | 2G* |
|---|---|---|---|---|---|---|---|
| Pheromone | Ferrugineol | Ferrugineol | Ferrugineol | Ferrugineol | Sordidin | Codlemone | Ferrugineol |
| Pheromone synergizing compound | Ethyl acetate | Ethyl acetate | Ethyl acetate | Ethyl acetate | Isoamyl acetate | Ethyl acetate | Ethyl acetate |
| alcohol (g) | 17.61 | 17.52 | 17.36 | 16.89 | 19.76 | 19.51 | 17.61 |
| Pheromone synergizing compound (g) | 5.87 | 5.84 | 5.79 | 5.63 | 6.59 | 19.51 | 5.87 |
| pheromone(g) | 0.94 | 0.93 | 0.93 | 0.90 | 0.13 | 7.80 | 0.94 |
| Polymer M53 (g) | 0.12 | 0.23 | 0.46 | 1.13 | 0.26 | 0.39 | 0 |
| Tocopherol | 0.47 | 0.47 | 0.46 | 0.45 | 0.26 | 0.78 | 0.47 |
| total (g) | 25 | 25 | 25 | 25 | 27 | 48 | 25 |

*not of the invention

It can be seen in Examples 2C and 2D that the formulations are clear at 40° C. but show a slight haze at 20° C. which is characteristic of the limited solubility of polymers at temperatures of the order of 20° C.

Example 3

Comparison of Evaporation Kinetics as a Function of Composition in Ventilated Ovens In order to compare the evaporation kinetics, we have placed bottles corresponding to the solutions in Examples 2A-2D and 2G in 2 ventilated ovens. The first oven is set at 30° C. and the second at 40° C.

We regularly measure the weight of each bottle by weighing and deduce the amount evaporated since the beginning of the experiment. The half-lives and corresponding to 90% diffusion are reported in the following table.

| Example | 2A | 2B | 2C | 2D | 2G |
|---|---|---|---|---|---|
| 40° C. | | | | | |
| T50 (d) | 48 | 68 | 94 | 149 | 3 |
| T90 (d) | 96 | 154 | 232 | 296 | 7 |

-continued

| Example | 2A | 2B | 2C | 2D | 2G |
|---|---|---|---|---|---|
| 30° C. | | | | | |
| T50 (d) | 61.00 | 82.00 | 109 | 168.00 | 15.00 |
| T90 (d) | 133.00 | 189.00 | 272 | 365.00 | 30.00 |

This table shows that the durations of formulations with the polymer M53 all have half-lives of more than 2 months regardless of oven temperature, whereas the formulation without polymer (2G) evaporates in fewer than 10 days.

We also observe that the difference in evaporation at 30° C. and 40° C. for these formulations is no more than 50%, whereas the formulation 2G evaporates 5 times faster at 40° C. than at 30° C. It is another interest of the invention to limit the differences in diffusion time as a function of temperature.

Example 4

Example of Red Weevil Trapping with Diffusers Filled with Formulation 2B

Wick diffusers containing the solution are placed in 5 water-filled pitfall traps on 21 Mar. 2017. They are placed 10 meters from palm trees infested with red weevils. The diffuser is replaced on 12 Sep. 2017.

| Month (2017) | April | May | June | July | August | September |
|---|---|---|---|---|---|---|
| monthly average per trap | 4.7 | 8.4 | 8.2 | 7.9 | 13.2 | 14.4 |

We note that trapping has increased from the beginning of the experiment until 12 Sep. 2017 when the diffusion bottles were changed. This shows that the diffusion time in real conditions is more than 4.5 months.

The invention claimed is:

1. An insect pheromone liquid formulation comprising:
a) 20% to 90%, by volume, of ethanol, based on total volume of the formulation,
b) 0.1% to 10%, by weight based on total weight of the formulation, of at least one insect pheromone whose boiling temperature is greater than 180° C. at atmospheric pressure,
c) 0.1% to 10% by weight based on total weight of the formulation of a polymer whose solubility in ethanol is greater than 10% (w/v) at 70° C. and less than 1% (w/v) at 20° C.,
d) 0 to 40% by weight based on total weight of the formulation of ethyl acetate or isoamyl acetate,
e) 0 to 5% by weight based on total weight of the formulation of antioxidant,
wherein the polymer is a PMMA-PABu-PMMA triblock acrylic block copolymer.

2. The formulation according to claim 1, wherein the antioxidant is selected from vitamin E, butylated hydroxyanisole (BHA), butylated hydroxytoluene (BHT) and mixtures thereof.

3. The formulation according to claim 1, wherein the insect pheromone is selected from red palm weevil pheromone, banana weevil pheromone, click beetle pheromone, olive fly pheromone, codling moth pheromone, husk fly pheromone, *Eudemis* pheromones, vine moth pheromones, sordidin, ferrugineol, ferrugineone, sordinin, codlemone and mixtures thereof.

4. The formulation according to claim 1, wherein the insect pheromone is selected from lepidopteran sex pheromones, coleopteran pheromones, dipteran pheromones and mixtures thereof.

5. The formulation according to claim 1, wherein the insect pheromone b) is sordidin and the compound d) is isoamyl acetate.

6. The formulation according to claim 1, wherein the insect pheromone b) is ferrugineol or codlemone and the compound d) is ethyl acetate.

7. A diffuser comprising:
a tank with an opening,
a formulation as claimed in claim 1,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

8. A diffuser comprising:
a tank with an opening,
a formulation as claimed in claim 2,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

9. A diffuser comprising:
a tank with an opening,
a formulation as claimed in claim 3,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

10. A diffuser comprising:
a tank with an opening,
a formulation as claimed in claim 4,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

11. A diffuser comprising:
a tank with an opening,
a formulation as claimed in claim 5,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

12. A diffuser comprising:
a tank with an opening,
a formulation as claimed in claim 6,
a cap closing the tank and having an opening,
a diffusion means passing through the cap and having a portion in contact with the formulation and the other portion extending above the cap; said diffusion means allowing migration of the formulation from the portion in contact with the formulation to the portion extending above the cap and allowing evaporation of the formulation.

13. A method for protecting a crop against insect pests, comprising applying a formulation according to claim 1 in the proximity of the crop.

14. A method for protecting a crop against insect pests, comprising placing a diffuser according to claim 7 in the proximity of the crop.

* * * * *